F. P. MURPHEY.
WIRE REEL AND MOUNTING THEREFOR.
APPLICATION FILED NOV. 23, 1908.
939,616.
Patented Nov. 9, 1909.
2 SHEETS—SHEET 1.
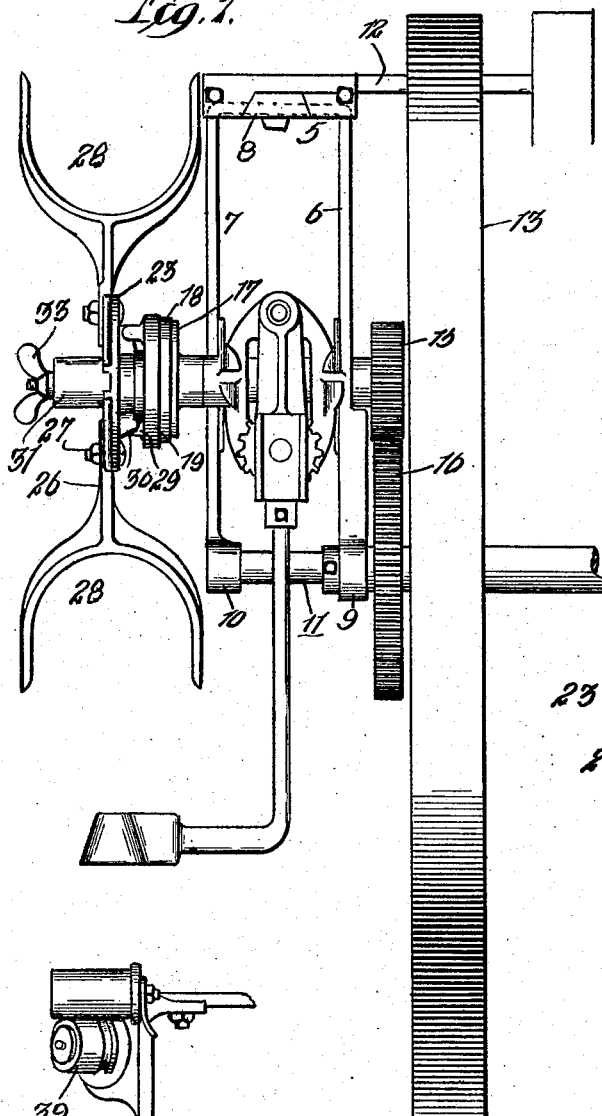
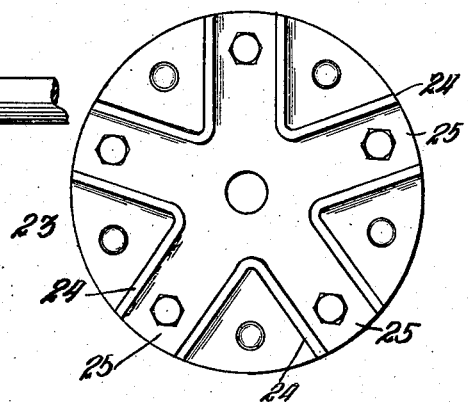
Witnesses:
Wm. C. Bond
Pierson W. Banning.
Inventor
Frank P. Murphey
by Banning & Banning
Attys.

F. P. MURPHEY.
WIRE REEL AND MOUNTING THEREFOR.
APPLICATION FILED NOV. 23, 1908.
939,616.
Patented Nov. 9, 1909.
2 SHEETS—SHEET 2.
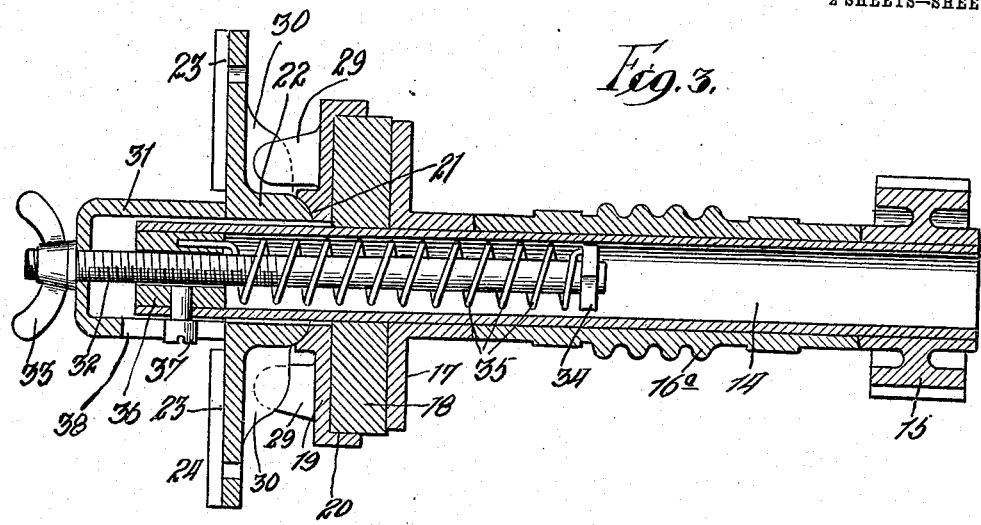
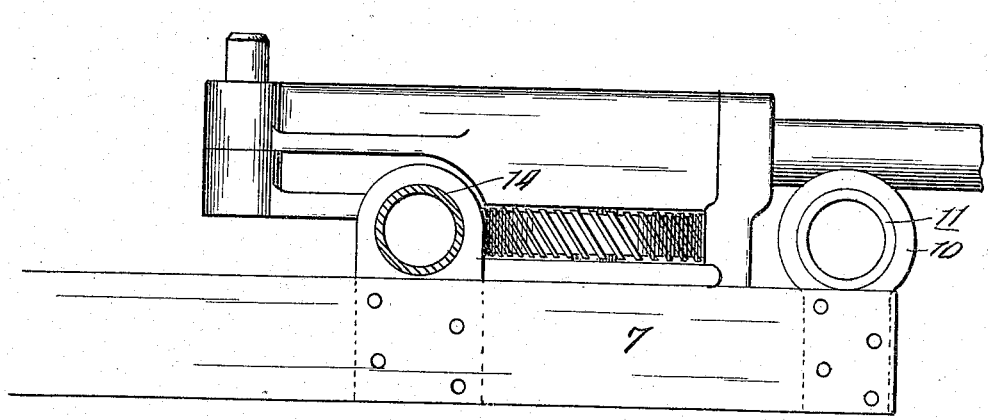
Witnesses:
Wm P. Bond
Pierson W. Banning
Inventor:
Frank P. Murphey
by Banning & Banning
Attys.

UNITED STATES PATENT OFFICE.

FRANK P. MURPHEY, OF DECATUR, ILLINOIS.

WIRE-REEL AND MOUNTING THEREFOR.

939,616.

Specification of Letters Patent.

Patented Nov. 9, 1909.

Application filed November 23, 1908. Serial No. 464,087.

*To all whom it may concern:*

Be it known that I, FRANK P. MURPHEY, a citizen of the United States, residing at Decatur, in the county of Macon and State of Illinois, have invented certain new and useful Improvements in Wire-Reels and Mountings Therefor, of which the following is a specification.

This invention relates to reels of the character ordinarily employed on corn or other grain planters for winding up and unwinding the check row wire before or after the corn planting operation. In certain prior constructions it has been the practice to mount the reel for the wire immediately above the main axle of the planter, and in relatively close proximity to the guide rollers for the check row wire which are ordinarily located near the forward end of the planter. This method of mounting the reel is objectionable for the reason that the wire is turned at a very sharp angle between the rollers and the reel, and this is too short a space for manipulating the wire back and forth as it is wound up on the reel.

The object of the present invention is to so mount the reel that it will be located toward the rear end of the planter instead of near the center thereof and in substantial alinement with the guide rollers, whereby a much greater space will be afforded for the movement of the wire, transversely of the reel, and whereby friction will be reduced by bringing the reel into substantial alinement with the wire itself.

Further objects of the invention are to improve the construction of the reel and the friction clutch mechanism by which it is driven, whereby the tension of the clutch members can be adjusted without difficulty and in a simple and reliable manner; and to improve generally the construction of the reel mechanism and mounting as a whole, and as regards the individual parts thereof.

Further objects will appear from a detailed description of the invention, which consists in the features of construction and combination of parts hereinafter described and pointed out in the claims as new.

In the drawings, Figure 1 is a top or plan view of the reel and mounting therefor indicating the position of the guide rollers in front of the reel; Fig. 2 a face view of the reel hub; Fig. 3 a longitudinal sectional view of the clutch mechanism; and Fig. 4 a side elevation of the clutch casing and associated parts, with the reel sectioned away.

The clutch mechanism for the reel is carried by a frame 5, comprising inner and outer side rails 6 and 7 respectively, a rear cross head 8, giving the frame, as a whole a generally rectangular formation. The front face of the side rails are provided with sockets 9 and 10 respectively, which embrace the projected end 11 of the main shaft of the machine, being loosely mounted thereon and supported thereby. The rear cross head of the frame is supported upon a projecting bar 12 which is rigidly secured to a suitable portion of the rear end of the corn planter frame, and projects outwardly beyond the main drive wheel 13 thereof. The supporting bar 12 is preferably located at the same vertical elevation as the projecting end 11 of the main shaft, which arrangement serves to hold the frame, as a whole, in substantially horizontal position.

The side rails of the frame serve as a support for a tubular reel shaft 14, which is provided on its inner end with a spur pinion 15, which meshes with the gear wheel 16 mounted upon the main driving shaft of the machine. The tubular shaft carries a worm 16$^a$ of sleeve formation, which actuates suitable mechanism for swinging the wire back and forth as it advances to the reel; but in view of the fact that such mechanism is old in the art and forms no part of the present invention, it is not deemed necessary to describe it. Outside of the worm sleeve, the shaft carries a clutch disk 17, which is keyed onto the shaft, and which has secured thereto a clutch block 18 of wood, leather, or similar frictional material, the members 17 and 18 constituting the movable clutch section which is adapted to be constantly rotated with the tubular shaft 14.

The movable or power transmitting section of the clutch coöperates with a companion clutch member 19, which is loosely mounted upon a tubular shaft, and is provided in its front face with a recess 20, which receives the clutch block 18. The back of the clutch is dished out to provide a hub socket 21, which receives the rounded inner end of a reel hub 22, which hub projects outwardly from and is integrally formed with a spoke disk 23 having on its outer face radiating flanges 24, which serve to provide radiating channels 25, within which channels the spokes or arms 26 of the reel are entered and held by means of bolts 27. Each of the spokes or arms is bifurcated at its outer end 28, to receive the check row wire. The reel hub is loosely mounted on the tubular shaft and is rotatably mounted within the dished socket recess 22, and in order to impart rotation from the clutch member 19 of the reel hub, the clutch member is provided with a pair of lugs 29, which are adapted to engage a pair of lugs or abutments 30 on the inner face of the spoke disk of the reel, as shown in Fig. 3. This arrangement affords considerable freedom of movement between the clutch member and the reel hub, and at the same time compels rotation of the parts in unison when the lugs are brought into engagement.

In order to throw the clutch members into frictional engagement with one another, a cap 31 is provided, which abuts against the outer face of the supporting disk of the reel, through the outer wall of which cap is loosely entered an adjusting screw rod 32 having threaded on its end a wing nut 33. The adjusting screw rod is located within the tubular shaft 14, and is provided on its end with a nut 34, which receives one end of a coil spring 35, the other end of which is entered into a plug 36 which fills the outer end of the tubular shaft 14, and is held in place therein by means of a set screw 37 which projects outwardly through a slot 38 in the side wall of the cap 31.

In use, when it is desired to throw the clutch members into frictional engagement, in order to actuate the reel, the wing nut 33 can be screwed down, which serves to draw back the inner end of the adjusting rod which carries the spring, thereby compressing the spring between the nut 34 and the plug 36. This compression of the spring serves to bring the wing nut under spring pressure against the outer face of the cap 31, and this pressure against the cap will be in turn transmitted to the hub of the reel and to the frictional member 19, which coöperates with the frictional member 17, thereby securing sufficient friction to revolve the reel and at the same time permitting the clutch members to revolve with respect to one another in order that the reel may maintain a proper tension on the wire regardless of the speed of advance of the planter, and regardless of the size of the wire bundle carried by the reel. In view of the fact that the frictional block 18 is liable to be worn unevenly after continued usage, it is highly desirable that the mechanism be designed to compensate for such uneven wear, and this result is obtained by reason of the fact that the reel hub and the clutch, into which it is socketed, are very loosely mounted on the tubular shaft, and are adapted to have considerable freedom of movement thereon. When the clutch member is compressed by the hub of the reel, its acting face will adapt itself to the angle of the clutch block with which it coöperates, thereby maintaining a perfect frictional contact regardless of variations from the normal plane of the frictional surface.

The method of socketing the reel hub into the socket member and providing lugs or stops for imparting rotative effort permits the clutch member to have the necessary freedom of movement without affecting the operation of the reel itself, which will be frictionally driven regardless of the degree to which the frictional surfaces are worn.

By locating the mechanism entirely to the rear of the main axle of the machine, the reel will be held in substantial alinement with the rollers 39 and at a considerable distance therefrom, and the method of forming and mounting the frame, as a whole, permits the parts to be readily assembled in an easy and convenient manner.

What I claim as new and desire to secure by Letters Patent is:

1. In a device of the class described, a shaft, a friction clutch comprising a fixed clutch member mounted on the shaft, a loose clutch member coöperating therewith and provided on its outer face with lugs, a reel provided with a reel hub socketed in said loose clutch member, and further provided with lugs coöperating with the lugs on the loose clutch member, an adjusting rod entered into the shaft, a spring surrounding said rod and adapted to be compressed by the retraction of said rod, and connections between the rod and the reel hub for imparting pressure to the reel hub due to the compression of the spring, substantially as described.

2. In a device of the class described, a shaft, a friction clutch comprising a fixed clutch member mounted on the shaft, a loose clutch member coöperating therewith and provided on its rear face with lugs, a reel provided with a reel hub socketed in said loose clutch member, and further provided with lugs coöperating with the lugs on the loose clutch member, an adjusting rod entered into the shaft, a spring surrounding said rod and adapted to be compressed by the retraction of said rod, a cap surrounding the rod and bearing against the reel hub, and an adjusting nut on the end of the rod bearing against the cap and adapted to transmit pressure against the cap due to the compression of the spring, substantially as described.

3. In mechanism of the class described, in combination with a main shaft and a drive wheel mounted thereon, an extension on the end of the main shaft outwardly projecting beyond the drive wheel, a frame carried by said extension and having bearing points thereon a sufficient distance apart to prevent lateral movement of the frame, a support for the rear end of the frame extending outside of the periphery of the drive wheel, and a reel carried by the frame, substantially as described.

4. In mechanism of the class described, in combination with a main shaft and a drive wheel mounted thereon, an extension on the end of the main shaft outwardly projecting beyond the drive wheel, a frame carried by said extension and having bearing points thereon a sufficient distance apart to prevent lateral movement of the frame, a support for the rear end of the frame extending outside of the periphery of the drive wheel, and a reel carried by the frame, the frame extending rearwardly from the extension on the main shaft, substantially as described.

5. In mechanism of the class described, in combination with a main shaft and a drive wheel mounted thereon, an extension on the end of the main shaft outwardly projecting beyond the drive wheel, a frame carried by said extension and having bearing points thereon a sufficient distance apart to prevent lateral movement of the frame, a support for the rear end of the frame extending outside of the periphery of the drive wheel, a reel carried by the frame, a friction clutch for rotating the reel, and gearing between the friction clutch and the main shaft for actuating the clutch, substantially as described.

6. In mechanism of the class described, in combination with a main shaft and a drive wheel mounted thereon, an extension on the end of the main shaft outwardly projecting beyond the drive wheel, a frame carried by said extension and having bearing points thereon a sufficient distance apart to prevent lateral movement of the frame, a support for the rear end of the frame extending outside of the periphery of the drive wheel, a reel carried by the frame, the frame extending rearwardly from the extension on the main shaft, a friction clutch for rotating the reel, and gearing between the friction clutch and the main shaft for actuating the clutch, substantially as described.

7. In mechanism of the class described, in combination with a main shaft and a drive wheel mounted thereon, an extension on the main shaft extending outwardly therefrom beyond the drive wheel and in axial alinement with the shaft, a frame extending rearwardly from said extension and comprising side rails and a connecting cross portion, said side rails being spaced a considerable distance apart and mounted upon the extension at points sufficiently distant from one another to prevent lateral movement of the frame, a bar supporting the rear end of the frame and extending behind the drive wheel and connecting with the main frame of the machine, a reel carried by the frame, a friction clutch for imparting rotation to the reel, and a gearing between the main shaft and the friction clutch for actuating the clutch, substantially as described.

FRANK P. MURPHEY.

Witnesses:
KINNEY TUCKER,
J. H. KROUT.